US009083955B2

(12) United States Patent
Suzui

(10) Patent No.: US 9,083,955 B2
(45) Date of Patent: Jul. 14, 2015

(54) THREE-DIMENSIONAL IMAGE PICKUP SYSTEM

(71) Applicant: CANON KABUSHIKI KAISHA, Tokyo (JP)

(72) Inventor: Masaki Suzui, Utsunomiya (JP)

(73) Assignee: CANON KABUSHIKI KAISHA (JP)

( * ) Notice: Subject to any disclaimer, the term of this patent is extended or adjusted under 35 U.S.C. 154(b) by 427 days.

(21) Appl. No.: 13/677,359

(22) Filed: Nov. 15, 2012

(65) Prior Publication Data

US 2013/0128007 A1 May 23, 2013

(30) Foreign Application Priority Data

Nov. 17, 2011 (JP) ................................. 2011-251467

(51) Int. Cl.
H04N 13/02 (2006.01)

(52) U.S. Cl.
CPC ....... *H04N 13/0203* (2013.01); *H04N 13/0239* (2013.01); *H04N 13/0246* (2013.01); *H04N 13/0296* (2013.01)

(58) Field of Classification Search
USPC ............. 348/49, 50, 51, 54, 46, 42, 237, 267, 348/344, 345, 348, 349, 350, 364, 745, 348/807; 351/204, 210, 222; 359/19, 210.1, 359/354, 356, 433, 448, 489.14, 489.18, 359/642, 676, 810
See application file for complete search history.

(56) References Cited

U.S. PATENT DOCUMENTS

| 4,818,858 | A | * | 4/1989 | Sorimachi et al. | ......... 250/203.2 |
|---|---|---|---|---|---|
| 4,961,639 | A | * | 10/1990 | Lazarus | .......................... 351/41 |
| 5,200,815 | A | * | 4/1993 | Tsujihara et al. | ............. 348/181 |
| 5,398,083 | A | * | 3/1995 | Tsujihara et al. | ............. 348/807 |
| 5,557,454 | A | * | 9/1996 | Takahashi | ...................... 359/378 |
| 5,861,936 | A | * | 1/1999 | Sorensen | ...................... 351/200 |
| 2001/0003490 | A1 | * | 6/2001 | Kawasaki et al. | ............. 359/385 |
| 2003/0142285 | A1 | * | 7/2003 | Enomoto | ......................... 355/77 |
| 2004/0130679 | A1 | * | 7/2004 | Hosoi | ......................... 351/222 |
| 2005/0053274 | A1 | * | 3/2005 | Mayer et al. | .................... 382/154 |
| 2009/0237494 | A1 | * | 9/2009 | Oota et al. | ...................... 348/51 |
| 2009/0290122 | A1 | * | 11/2009 | Hosoi et al. | .................... 351/201 |
| 2010/0194972 | A1 | * | 8/2010 | Matsuzawa et al. | .......... 348/349 |
| 2011/0096379 | A1 | * | 4/2011 | Kurokawa | ...................... 358/498 |
| 2011/0199462 | A1 | * | 8/2011 | Nanri et al. | ...................... 348/47 |

FOREIGN PATENT DOCUMENTS

| JP | 9026635 A | 1/1997 |
|---|---|---|
| JP | 2006162990 A | 6/2006 |

* cited by examiner

*Primary Examiner* — Jefferey Harold
*Assistant Examiner* — Mustafizur Rahman
(74) *Attorney, Agent, or Firm* — Rossi, Kimms & McDowell LLP

(57) ABSTRACT

Provided is a three-dimensional image pickup system including: a pair of lens apparatus; a camera apparatus for picking up subject images formed by the pair of lens apparatus; a convergence angle changing unit for changing a convergence angle of the pair of lens apparatus; a controller for controlling the convergence angle of the pair of lens apparatus in association with an operation of focus lens units of the pair of lens apparatus; and an interlock switching unit for switching between an interlocked state in which the convergence angle is interlocked with the operation of the focus lens units and a non-interlocked state in which the convergence angle is not interlocked with the operation of the focus lens units.

9 Claims, 13 Drawing Sheets

FIG. 9

| | | FOCUS OBJECT DISTANCE | | | | |
|---|---|---|---|---|---|---|
| | | a | b | c | d | e |
| ZOOM FOCAL LENGTH | A | θ1 (1) | θ6 (6) | θ11 (11) | θ16 (16) | θ21 (21) |
| | B | θ2 (2) | θ7 (7) | θ12 (12) | θ17 (17) | θ22 (22) |
| | C | θ3 (3) | θ8 (8) | θ13 (13) | θ18 (18) | θ23 (23) |
| | D | θ4 (4) | θ9 (9) | θ14 (14) | θ19 (19) | θ24 (24) |
| | E | θ5 (5) | θ10 (10) | θ15 (15) | θ20 (20) | θ25 (25) |

SHOOTING SCENE-1 (θ1)     SHOOTING SCENE-2 (θ18)

FIG. 10

| | | FOCUS OBJECT DISTANCE | | | | |
|---|---|---|---|---|---|---|
| | | a | b | c | d | e |
| ZOOM FOCAL LENGTH | A | θ1 (1) | θ6 (6) | θ11 (11) | θ16 (16) | θ21 (21) |
| | B | θ2 (2) | θ7 (7) | θ12 (12) | θ17 (17) | θ22 (22) |
| | C | θ3 (3) | θ8 (8) | θ13 (13) | θ18 (18) | θ23 (23) |
| | D | θ4 (4) | θ9 (9) | θ14 (14) | θ19 (19) | θ24 (24) |
| | E | θ5 (5) | θ10 (10) | θ15 (15) | θ20 (20) | θ25 (25) |

SHOOTING SCENE-1
(ZOOM:A, FOCUS: a, CONVERGENCE ANGLE: θ1)

SHOOTING SCENE-2
(ZOOM:C, FOCUS: d, CONVERGENCE ANGLE: θ18)

THREE-DIMENSIONAL IMAGE PICKUP SYSTEM

BACKGROUND OF THE INVENTION

1. Field of the Invention

The present invention relates to a three-dimensional image pickup system including a pair of lens apparatus and a camera apparatus. In particular, the present invention relates to a three-dimensional image pickup system having an interlock control function in which a convergence angle of the pair of lens apparatus is changed in association with focusing.

2. Description of the Related Art

Conventionally, as to the three-dimensional image pickup system, there is known a technology for automatically adjusting a parallax by controlling a convergence angle between lens apparatus for a right eye (right side) and for a left eye (left side) for a three-dimensional image pickup apparatus (namely, an angle between optical axes of the left and right lenses) in association with focusing or the like of the lens apparatus.

For instance, Japanese Patent Application Laid-Open No. H09-026635 and Japanese Patent Application Laid-Open No. 2006-162990 disclose technologies for controlling the convergence angle between the lens apparatuses in association with a focus action of the lens apparatus.

However, the conventional technologies disclosed in Japanese Patent Application Laid-Open No. H09-026635 and Japanese Patent Application Laid-Open No. 2006-162990 have the following problems. For instance, it is supposed that a photographer wants to shoot a motion picture with a fixed convergence angle after operating the convergence angle in association with focusing in order to largely change a shooting scene. In this case, despite of the photographer's intention, the convergence angle will operate in association with focusing.

On the other hand, in a manual operation of focusing, the convergence angle may be moved in association with an unintentional action of a focus operation member in a case where the photographer unintentionally touches a manual operation member, a case where a mechanical vibration is applied to the member, a case where the member is not completely stopped mechanically because of loose fixation, or other cases. In addition, the convergence angle may reciprocate in association with a wobbling motion (reciprocating motion for searching for an in-focus position) in a contrast AF.

In a case of two-dimensional photography (hereinafter referred to as 2D photography) other than three-dimensional photography, the above-mentioned unintentional action of the focus (member) and the wobbling motion do not become obvious as a large problem of the image as long as within a depth of field. However, in the case of the three-dimensional image pickup system in which the convergence angle changes in association with focusing, because the convergence angle acts in an interlocking manner even within the depth of field, there is a large obvious problem that a stereoscopic effect is largely changed as a problem unique to the three-dimensional image photography.

As described above, in the case of the three-dimensional image pickup system in which the convergence angle changes in association with focusing, it is necessary to change the interlock to non-interlock for an unintentional focus movement, for example.

SUMMARY OF THE INVENTION

Therefore, the present invention provides a three-dimensional image pickup system, in which the convergence angle acts in association with focusing, and interlock and non-interlock between the focusing and the convergence angle is switched as necessary.

According to an exemplary embodiment of the present invention, a three-dimensional image pickup system includes: a pair of lens apparatus; a camera apparatus for picking up subject images formed by the pair of lens apparatus; a convergence angle changing unit for changing a convergence angle of the pair of lens apparatus; a controller for controlling the convergence angle of the pair of lens apparatus in association with an operation of focus lens units of the pair of lens apparatus; and an interlock switching unit for switching between an interlocked state in which the convergence angle is interlocked with the operation of the focus lens units and a non-interlocked state in which the convergence angle is not interlocked with the operation of the focus lens units.

According to the present invention, it is possible to provide the three-dimensional image pickup system, in which the convergence angle changes in association with focusing, and the interlock and non-interlock between the focusing and the convergence angle is switched as necessary.

Further features of the present invention will become apparent from the following description of exemplary embodiments with reference to the attached drawings.

BRIEF DESCRIPTION OF THE DRAWINGS

FIG. 9 is a shot table showing a shot target position of the lens apparatus.

FIG. 10 is a shot table showing the shot target position of the lens apparatus.

DESCRIPTION OF THE EMBODIMENTS

Exemplary embodiments of the present invention are hereinafter described in detail with reference to the attached drawings.

Embodiment 1

Hereinafter, with reference to FIGS. 1 to 4, a three-dimensional image pickup system of Embodiment 1 of the present invention is described.

Figure 1:
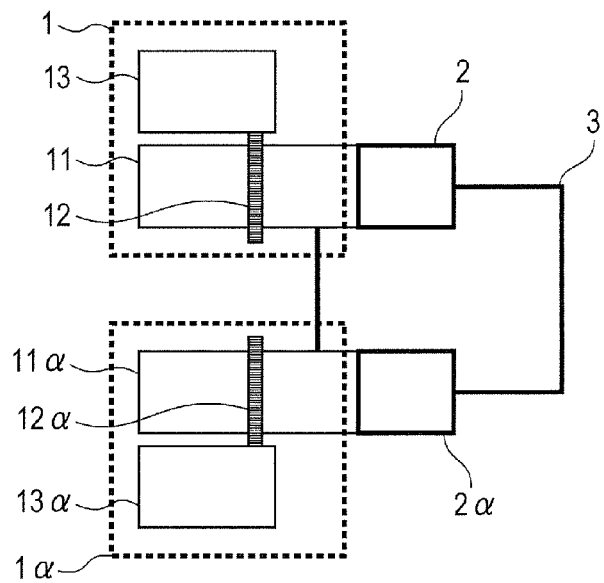
FIG. 1 is a functional block diagram of a three-dimensional image pickup system used in Embodiment 1.

First, with reference to FIG. 1, the three-dimensional image pickup system used in this embodiment is described.

FIG. 1 is a functional block diagram of the three-dimensional image pickup system.

The three-dimensional image pickup system illustrated in FIG. 1 mainly includes a lens apparatus 1 and a lens apparatus 1α acting as a right eye and a left eye, two camera apparatus 2 and 2α for photographing subject images through the two lens apparatus, and a base plate 3 for the two lens apparatus, which forms an angle θ between optical axes of the two lens apparatus (hereinafter referred to as a convergence angle θ). Details of the convergence angle θ are described with reference to FIG. 2.

Figure 2:
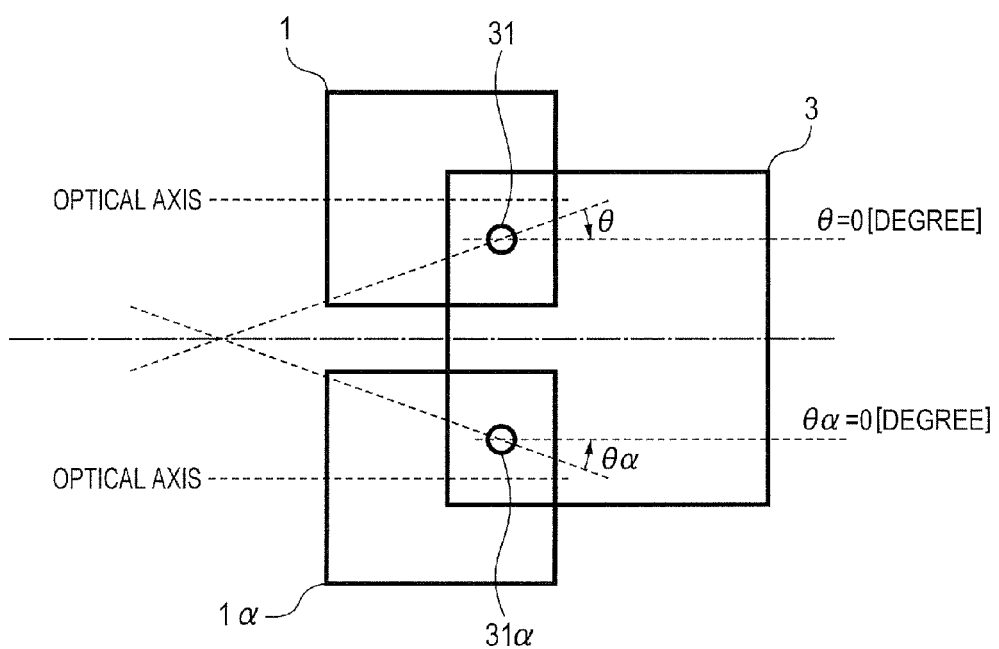
FIG. 2 is a schematic diagram of a base plate 3 of the three-dimensional image pickup system used in Embodiment 1.

FIG. 2 is a schematic diagram of the base plate 3. The base plate 3 is mechanically connected to the lens apparatus 1 and the lens apparatus 1α at a rotational axis 31 and a rotational axis 31α. As illustrated in FIG. 2, with reference to a state where the lens apparatus 1 and the lens apparatus 1α are disposed in parallel (θ=0 and θα=0), when rotating about the rotational axes so that the optical axes approach (cross) each other, angles between the reference and the optical axes are convergence angles θ and θα, respectively. The base plate 3 includes a convergence angle changing unit (not shown) and can pivot the lens apparatus 1 and 1α about the rotational axes 31 and 31α, because the lens apparatus 1 and 1α are connected to the base plate 3 in a rotatable manner via the rotational axes 31 and 31α. Thus, the convergence angles by the pair of lens apparatus 1 and 1α can be changed.

In the description below, because the lens apparatus 1 and the lens apparatus 1α, as well as the camera apparatus 2 and the camera apparatus 2α are disposed at different positions but have the same structure, descriptions of the lens apparatus 1α and the camera apparatus 2α are omitted. In addition, description of the convergence angle θα is also omitted.

Note that, elements of internal structures of the lens apparatus 1α and the camera apparatus 2α are denoted by numerals of elements of internal structures of the lens apparatus 1 and the camera apparatus 2 suffixed with "α".

The lens apparatus 1 is constituted mainly of an optical lens unit 11 for forming a subject image, a focus ring unit 12 having a focus adjustment function of the optical lens unit 11, and a drive unit 13 (hereinafter referred to as DU 13) that detects a position of the focus ring unit 12 so as to output a control signal of the convergence angle θ to the base plate 3.

Figure 3:
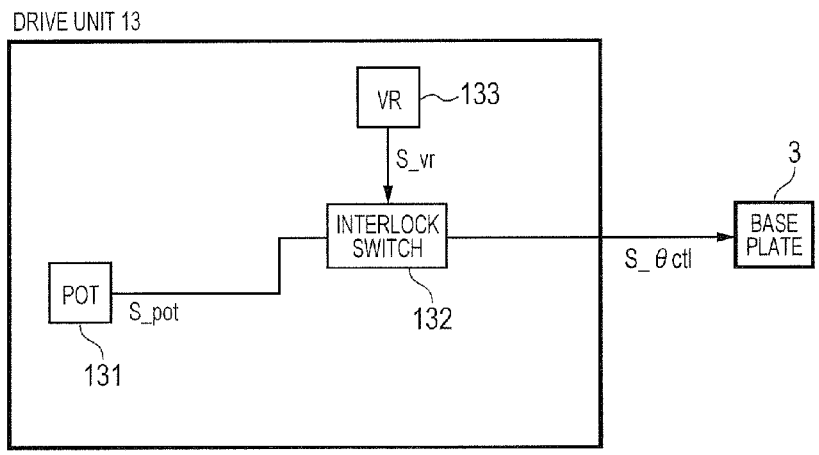
FIG. 3 is a functional block diagram of a DU 13 included in a lens apparatus 1 of Embodiment 1.

Next, with reference to FIG. 3, the DU 13 is described.

FIG. 3 is a functional block diagram of the DU 13.

The DU 13 is constituted mainly of a rotational analog potentiometer unit 131 (hereinafter referred to as a POT unit 131) that detects a position of the focus ring unit 12 and outputs a position signal S_pot, an interlock switching unit 132 that outputs a control signal (hereinafter referred to as control signal S_θctl) for controlling the convergence angle θ of the base plate 3, and an adjustment VR unit 133 that outputs an adjustment signal S_vr for adjusting a reference for switching the interlock switching unit 132.

Note that, unevenness is formed on a surface of the focus ring unit 12 mechanically and constitutes a structure to engage with a gear attached to the rotational axis of the POT unit 131. The POT unit 131 detects rotation of the focus ring unit 12 via this gear. The adjustment VR unit 133 is constituted of an analog volume and outputs the adjustment signal S_vr to the interlock switching unit 132.

Figure 4:
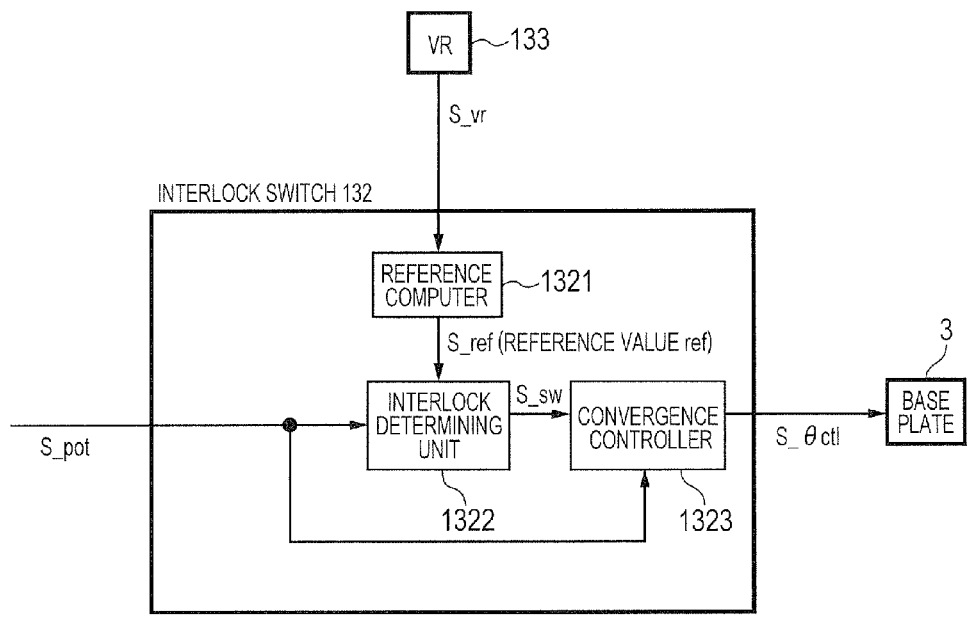
FIG. 4 is a functional block diagram of an interlock switching unit 132 included in the lens apparatus 1 of Embodiment 1.

Now, with reference to FIG. 4, the interlock switching unit 132 is described.

FIG. 4 is a functional block diagram of the interlock switching unit 132.

The interlock switching unit 132 is constituted mainly of a reference computer 1321, an interlock determining unit 1322, and a convergence controller 1323.

The reference computer 1321 is a computing unit that computes a reference value ref as a determination criterion for switching interlock and non-interlock between the convergence angle θ (convergence control signal S_θctl) and an operation of a focus lens unit. An AD converter included in the reference computer 1321 receives and converts the adjustment signal S_vr into a digital signal, and outputs the reference value ref as a reference signal S_ref to the interlock determining unit 1322. The interlock determining unit 1322 receives the position signal S_pot and the reference signal S_ref, determines to switch interlock and non-interlock between the convergence angle θ (convergence control signal S_θctl) and the operation of the focus lens unit, and outputs a result of the determination as a switching signal S_sw to the convergence controller 1323. Finally, the convergence controller 1323 receives the position signal S_pot and the switching signal S_sw, and outputs the control signal S_θctl to the base plate 3. Note that, in this embodiment, the interlock determining unit 1322 includes an AD converter so as to perform digital sampling of the position signal S_pot.

Figure 5:
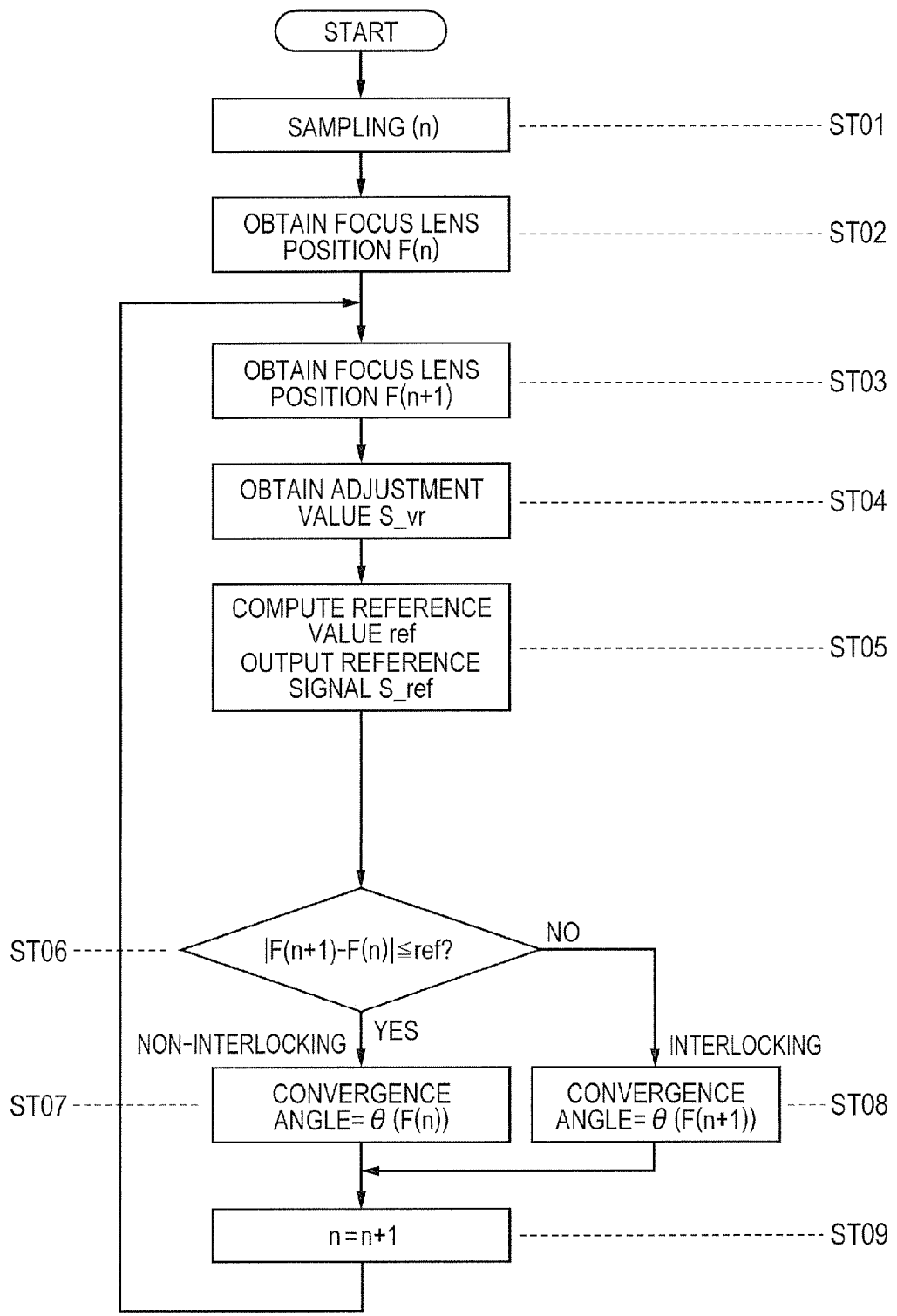
FIG. 5 is a flowchart illustrating a process about interlock switching of Embodiment 1.

Now, with reference to FIG. 5, an internal action of the DU 13, particularly a process in the interlock switching unit 132 is described in detail.

FIG. 5 is a flowchart mainly illustrating a switching process of interlock and non-interlock between the convergence angle θ (convergence control signal S_θctl) and the operation of the focus lens unit.

First, in Steps ST01 and ST02, the interlock determining unit 1322 obtains a focus lens position F(n) at time of sampling (n). Next, in Step ST03, the interlock determining unit 1322 obtains a focus lens position F(n+1). Next, in Steps ST04 and ST05, the reference computer 1321 obtains the adjustment signal S_vr, computes the reference value ref as the determination criterion for switching interlock and non-interlock based on the obtained adjustment signal S_vr, and outputs the computation result as the reference signal S_ref to the interlock determining unit 1322.

Further, in Step ST06, the interlock determining unit 1322 proceeds to Step ST07 when an absolute value of a difference (F(n+1)−F(n)) as a variation of the focus lens position is the reference value ref (reference signal S_ref) or smaller, or proceeds to Step ST08 when the absolute value is larger than the reference value. In Step ST07, the convergence controller 1323 computes the convergence angle θ (convergence control signal S_θctl) that is a convergence angle θ(F(n)) corresponding to the focus lens position at the last sampling (n), and outputs the result as the control signal S_θctl to the base plate 3. On the other hand, in Step ST08, the convergence controller 1323 computes the convergence angle θ that is a convergence angle θ(F(n+1)) corresponding to the focus lens position at sampling (n+1) of this time, and outputs the result as the control signal S_θctl to the base plate 3. Finally, in Step ST09, n is incremented (updated as n=n+1), and the process returns to Step ST03.

In this way, if a difference of focus lens positions between samplings of the last time and this time is the reference value ref as a threshold value or smaller, the convergence angle θ (control signal S_θctl) is set to the convergence angle θ corresponding to the focus lens position at the last sampling (n). In other words, the convergence angle θ (control signal S_θctl) becomes a non-interlocked state with the focus lens position. In addition, if the difference is larger than the reference value ref, the convergence angle θ is set to a value corresponding to the focus lens position at the sampling (n+1) of this time. In other words, the convergence angle θ (control signal S_θctl) becomes an interlocked state with the focus lens position.

In this embodiment, by setting the reference value ref to, for example, a micro motion (vibration) of the focus ring unit 12 generated in a non-operation state or a noise level superimposed on a detection result of the POT unit 131, it is possible to eliminate an undesired action of the convergence angle θ caused by such a phenomenon.

In addition, by setting the reference value ref to a working range of the focus ring unit 12 when the photographer unintentionally touches the focus ring unit 12 by hand or a working range of the focus ring unit 12 due to a micro fluctuation of the hand in the manual operation, it is possible to eliminate an undesired action of the convergence angle θ caused by a photographer's unintentional operation of the focus ring unit that may occur in a focus operation.

As to this determination of the reference value ref, it is preferred to adjust the adjustment VR unit 133 while observing the above-mentioned phenomenon to be eliminated.

Embodiment 2

Now, with reference to FIGS. 6 to 9, a three-dimensional image pickup system of Embodiment 2 of the present invention is described.

This embodiment is different from Embodiment 1 mainly in that a focus shot function is supported and a depth of focus is considered in switching of interlock and non-interlock between the convergence angle θ and the operation of the focus lens unit.

Now, details of this difference are mainly described.

Note that, in this embodiment too, because a lens apparatus 4 and a lens apparatus 4α have different layouts but the same structure, description of the lens apparatus 4α is omitted. In addition, elements of an internal structure of the lens apparatus 4α are denoted by numerals of elements of an internal structure of the lens apparatus 4 suffixed with "α".

Figure 6:
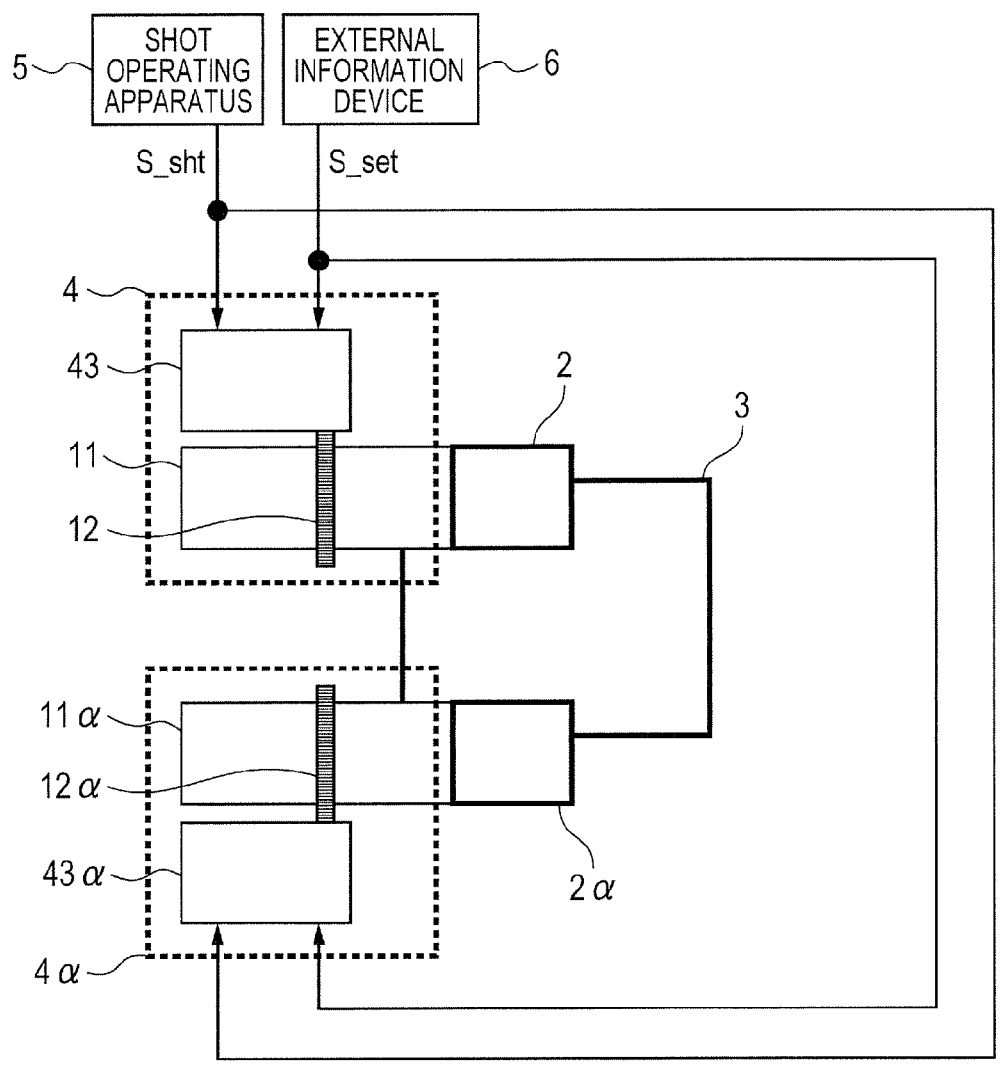
FIG. 6 is a functional block diagram of a three-dimensional image pickup system used in Embodiment 2.

FIG. 6 is a functional block diagram of the three-dimensional image pickup system used in this embodiment, which is constituted mainly of the lens apparatus 4, the lens apparatus 4α, the camera apparatus 2, the camera apparatus 2α, the base plate 3, a shot operating apparatus 5 as a shot controller, and an external information device 6.

The lens apparatus 4 uses a DU 43 instead of the DU 13 in Embodiment 1. Details of this DU 43 are described later. The shot operating apparatus 5 (hereinafter referred to as shot demand 5) is a controller for moving the focus lens unit and a zoom lens unit of the lens apparatus 4 as well as the convergence angle θ (control signal S_θctl) of the base plate 3 to predetermined positions, namely for performing a so-called "shot" action, and outputs a shot signal S_sht to the lens apparatus 4. The external information device 6 is an information device for rewriting a shot table (table 4325) of the DU 43 from outside of the lens apparatus 4, and is constituted of a notebook type PC and rewrite software. Note that, the shot demand 5 and the external information device 6 are connected to the lens apparatus 4 via communication cables or the like so that communication is performed therebetween. Note that, actions of these are described later.

Figure 7:
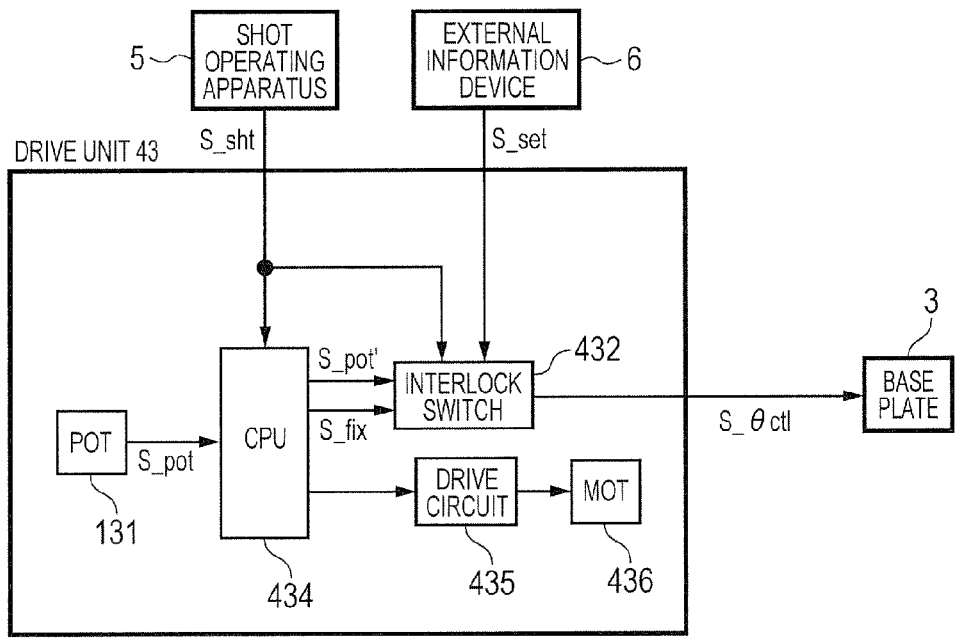
FIG. 7 is a functional block diagram of a DU 43 included in a lens apparatus 4 of Embodiment 2.

Next, with reference to FIG. 7, the DU 43 is described in detail.

FIG. 7 is a functional block diagram of the DU 43.

The DU 43 of this embodiment is different from the DU 13 of Embodiment 1 in that an interlock switching unit 432 is used instead of the interlock switching unit 132 and that a CPU 434, a drive circuit 435, and a MOT 436 are added.

The CPU 434 is a computing unit of the DU 43, which fetches the position signal S_pot output from the POT unit 131 via an AD converter included in the CPU 434, generates a focus drive signal, and outputs the focus drive signal to the drive circuit 435. In addition, the CPU 434 outputs digital data S_pot' after AD conversion of the position signal S_pot to the interlock switching unit 432. Further, the CPU 434 receives the shot signal S_sht output from the shot demand 5 and outputs a shot action completion signal S_fix to the interlock switching unit 432.

The drive circuit 435 and the MOT 436 are a drive circuit and a drive motor for electrically driving the focus ring unit 12. The drive circuit 435 amplifies the focus drive signal output from the CPU 434 and drives the MOT 436. Note that, similarly to the POT unit 131, there is a structure in which the unevenness formed on a surface of the focus ring unit 12 engages with a gear attached to the drive rotational axis of the MOT 436, and the MOT 436 rotates the focus ring unit 12 via the gear.

Figure 8:
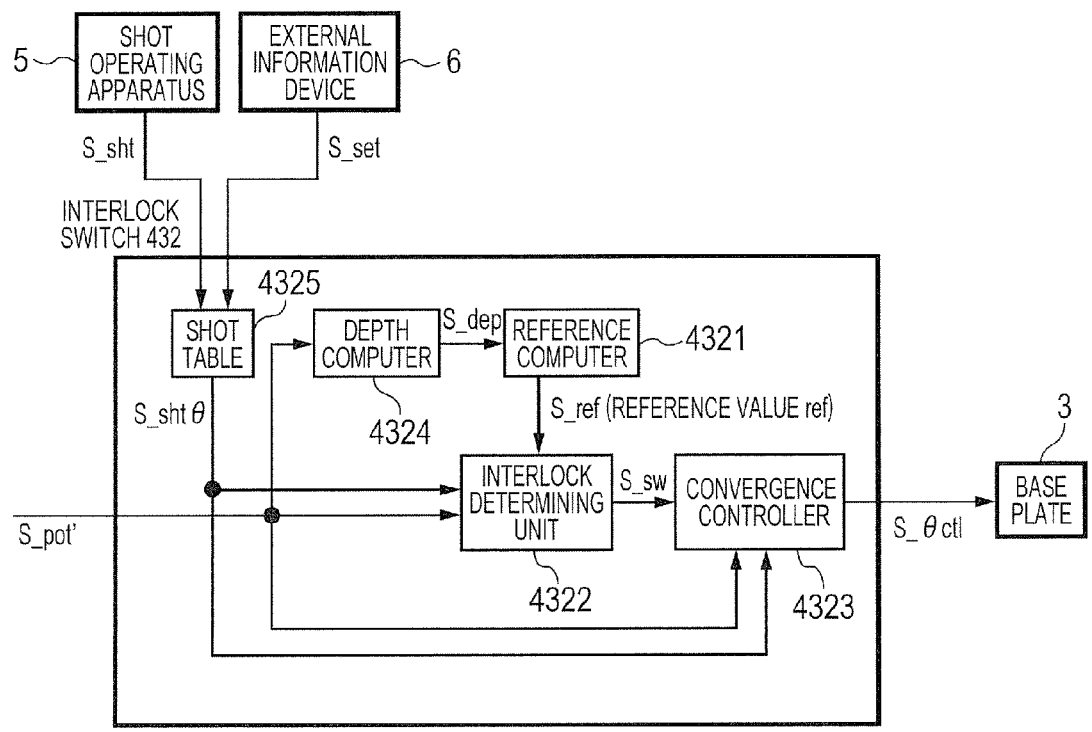
FIG. 8 is a functional block diagram of an interlock switching unit 432 included in the lens apparatus 4 of Embodiment 2.

Further, with reference to FIG. 8, details of the interlock switching unit 432 are described.

FIG. 8 is a functional block diagram of the interlock switching unit 432.

The interlock switching unit 432 is constituted mainly of a reference computer 4321, an interlock determining unit 4322, a convergence controller 4323, a depth computer 4324, and the shot table 4325.

The depth computer 4324 receives a position signal S_pot' and computes a current focus object distance. Then, the depth computer 4324 computes a range of a depth of field of this object distance and outputs the range of the depth of field as a depth signal S_dep to the reference computer 4321. The reference computer 4321 receives the depth signal S_dep, computes a determination criterion corresponding to this depth signal, and outputs the computation result as the reference signal S_ref to the interlock determining unit 4322. A method of computing this determination criterion is described later. In addition, the shot table (hereinafter referred to as table 4325) receives the shot signal S_sht and a table setting signal S_set output from the shot demand 5 or the external information device 6, and outputs a shot convergence target signal S_shtθ to the interlock determining unit 4322 and the convergence controller 4323. The interlock determining unit 4322 receives the position signal S_pot', the reference signal S_ref, and the shot convergence target signal S_shtθ, determines to switch interlock and non-interlock between the convergence angle θ (control signal S_θctl) and the operation of the focus lens unit, and outputs the determination result as the switching signal S_sw to the convergence controller 4323. Finally, the convergence controller 4323 receives the position signal S_pot', the shot convergence target signal S_shtθ, and the switching signal S_sw, and outputs the control signal S_θctl to the base plate 3.

Actions of the reference computer 4321 and the depth computer 4324 are described below.

The depth computer 4324 receives the position signal S_pot' indicating a focus lens position and computes the object distance from the position signal. Then, the depth computer 4324 computes a depth D as a function of the object distance and outputs the computation result as the depth signal S_dep to the reference computer 4321.

The reference computer 4321 generates the determination criterion for switching interlock and non-interlock between the convergence angle θ (control signal S_θctl) and the operation of the focus lens unit considering the input depth signal S_dep. In this embodiment, the determination criterion is set to be the same as the depth D.

Note that, because the depth D is a function of the object distance, this determination criterion is also updated along with a change of the focus lens position. In addition, because the depth D is also a function of an aperture stop and zooming in the same manner, these factors are also considered to update the determination criterion.

Next, the shot demand 5 and the shot table 4325 are described.

The shot demand 5 is an operating apparatus for performing a shot drive of the zoom lens unit, the focus lens unit, and the convergence angle θ of the two lens apparatus of this embodiment, and is constituted of mainly a display unit, a display selection switch, a display ON/OFF switch, shot switches 1 to 5, and a memory.

Specifically, the display unit switches between a display state and a non-display state by the display ON/OFF switch. Further, the display unit displays a result of the operation with the display selection switch (corresponding to numbers (1) to (25) of the shot table one-to-one as described below). Further, when the shot switch to be assigned to the displayed numbers (1) to (25) is pressed, the display numbers and the shot switches 1 to 5 are associated, and this relationship is stored in the memory. Note that, when the display unit is in the non-display state by the display ON/OFF switch, the assignment is disabled. Details of the shot action are described later.

FIG. 9 shows a shot table indicating shot target positions of the zoom lens unit, the focus lens unit, and the convergence angle θ of the lens apparatus 4, included in the table 4325.

As shown in FIG. 9, the shot table divides each of the focal length of the zoom lens and the object distance of the focus lens by five, and hence one convergence angle θ is determined with respect to a combination of the 5×5 matrix. Thus, convergence angles θ1 to θ25 are respectively assigned to individual combinations of the 5×5 matrix. Note that, in order to define a position in the matrix, in this embodiment, the first column and first row in this shot table is referred to as a number (1), the first column and second row is referred to as a number (2), and so forth, and the fifth column and fifth row is referred to as a number (25).

Here, with reference to FIGS. 11A and 11B and FIGS. 9 and 10, details of the shot action are described.

Figure 11A:
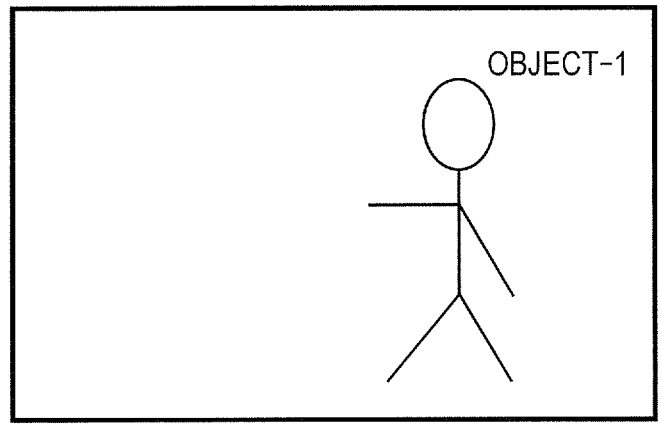
FIG. 11A is an image diagram of a shot shooting scene 1 of Embodiment 2.
Figure 11B:
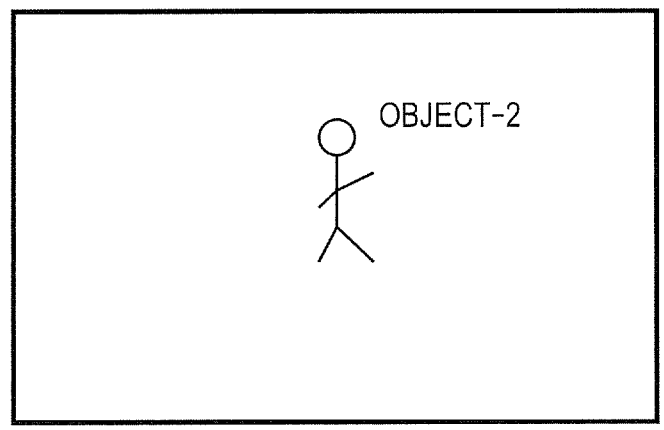
FIG. 11B is an image diagram of a shot shooting scene 2 of Embodiment 2.

FIGS. 11A and 11B are schematic diagrams of the shooting scene imaging two shooting scenes.

In order to assign a shooting scene 1 in FIG. 11A (number (1) in the shot table) and a shooting scene 2 in FIG. 11B (number (18) in the shot table) to the shot switch and the shot switch 2, in accordance with the above-mentioned assigning method, the shot switch 1 and the shot switch 2 are pressed when the display unit of the shot demand displays the number (1) and the number (18). Thus, the shooting scene 1 (zoom: A, focus: a, convergence angle: θ1) and the shooting scene 2 (zoom: C, focus: d, convergence angle: θ18) are set to the shot switch 1 and the shot switch 2.

An example of the above-mentioned shot function in a real use is described below. When the shot switch 1 is pressed, the shot (zoom: A, focus: a, convergence angle: θ1) suitable for the shooting scene 1 is performed. Next, in order to change the shooting scene to the shooting scene 2, the switch 2 is pressed. Then, the shot (zoom position: C, focus lens position: d, convergence angle: θ18) suitable for the shooting scene 2 is performed.

In addition, the external information device 6 is an editing apparatus for rewriting the shot table and is usually constituted of a personal computer and a writer apparatus.

This external information device 6 can rewrite the shot table itself. In addition, it is possible to adopt a structure in which the shot positions of the assignments 1 to 5 shown in FIG. 10 can be picked up from FIG. 9 and can be remounted to the lens apparatus. In this case, by preparing minimum necessary shot tables (the number thereof is not necessarily the same as the number of shot switches), it is possible to select the shot table from the shot demand more simply and quickly. In addition, the shot demand 5 may include this external information device 6.

Figure 12:
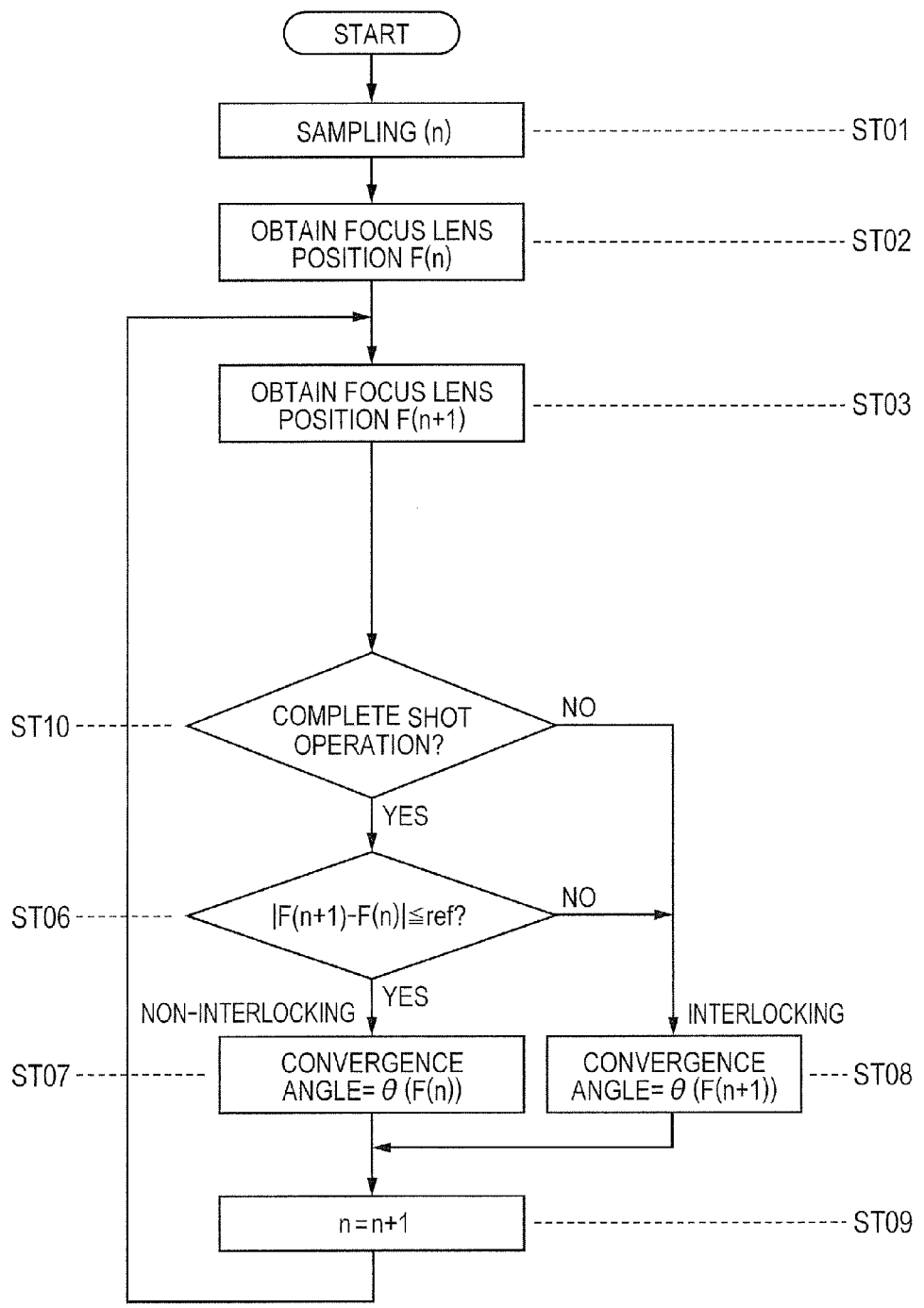
FIG. 12 is a flowchart illustrating a process about interlock switching of Embodiment 2.

Now, with reference to FIG. 12, an internal action of the DU 43, particularly the process in the interlock switching unit 432 is described in detail. Note that, description of the same step as in Embodiment 1 is omitted.

FIG. 12 is a flowchart illustrating mainly the switching process of interlock and non-interlock between the convergence angle θ (control signal S_θctl) and the operation of the focus lens unit, in which the switching is performed considering the above-mentioned shot function.

In Step ST10, when the shot is completed, the process proceeds to Step ST06. When the shot is not completed, the process proceeds to Step ST08.

In this way, when the shot action is completed, the convergence angle θ (control signal S_θctl) becomes the non-interlocked state with the operation of the focus lens unit. When the shot action is not completed, the convergence angle θ (control signal S_θctl) is in the interlocked state with the operation of the focus lens unit.

For instance, when the shooting scene is changed from the shooting scene 1 illustrated in FIG. 11A to the shooting scene 2 illustrated in FIG. 11B by the shot action, it is not necessary to perform the complicated setting of the convergence angle θ because of the above-mentioned process, but an appropriate convergence angle θ is promptly set. In addition, after the shot action is completed, the convergence angle θ becomes the non-interlocked state with the operation of the focus lens unit so that only the adjustment of the operation of the focus lens unit can be performed without interlock with the convergence angle θ.

As a result of the above description, setting work of the convergence angle θ, which is very complicated and needs time in the three-dimensional image pickup system, becomes unnecessary. In addition, it is also possible to secure convenience in changing the shooting scene, which is comparable to the 2D photography system.

Embodiment 3

Now, with reference to FIGS. 13 to 16, a three-dimensional image pickup system according to Embodiment 3 of the present invention is described.

This embodiment is different from Embodiment 1 mainly in that the former supports a wobbling motion of the focus lens unit of the camera apparatus having a contrast AF function for performing automatic focus based on the photographed image, concerning the switching of interlock and non-interlock between the convergence angle θ (control signal S_θctl) and the operation of the focus lens unit. The focus adjustment of the camera apparatus having the contrast AF function determines an in-focus position as a position where contrast becomes the maximum using an output signal from an image sensor. Therefore, it is necessary to drive the focus lens unit also after determining the in-focus position so as to check the in-focus position giving the maximum contrast or a direction of the in-focus position from a variation of the contrast caused by the drive of the focus lens unit. In other words, a reciprocating motion of the focus lens unit in a micro range performed for in-focus determination in the contrast AF is the so-called wobbling, and it is not necessary to change the convergence angle to follow the wobbling motion. This embodiment is the three-dimensional image pickup apparatus including a mechanism for the function.

Now, details of this difference are mainly described.

Note that, also in this embodiment, because a lens apparatus 7, a lens apparatus 7α, a camera apparatus 8, and a camera apparatus 8α have different layouts but the same structure, descriptions of the lens apparatus 7α and the camera apparatus 8α are omitted. In addition, elements of internal structures of the lens apparatus 7α and the camera apparatus 8α are denoted by numerals of elements of internal structures of the lens apparatus 7 and the camera apparatus 8 suffixed with "α".

Figure 13:
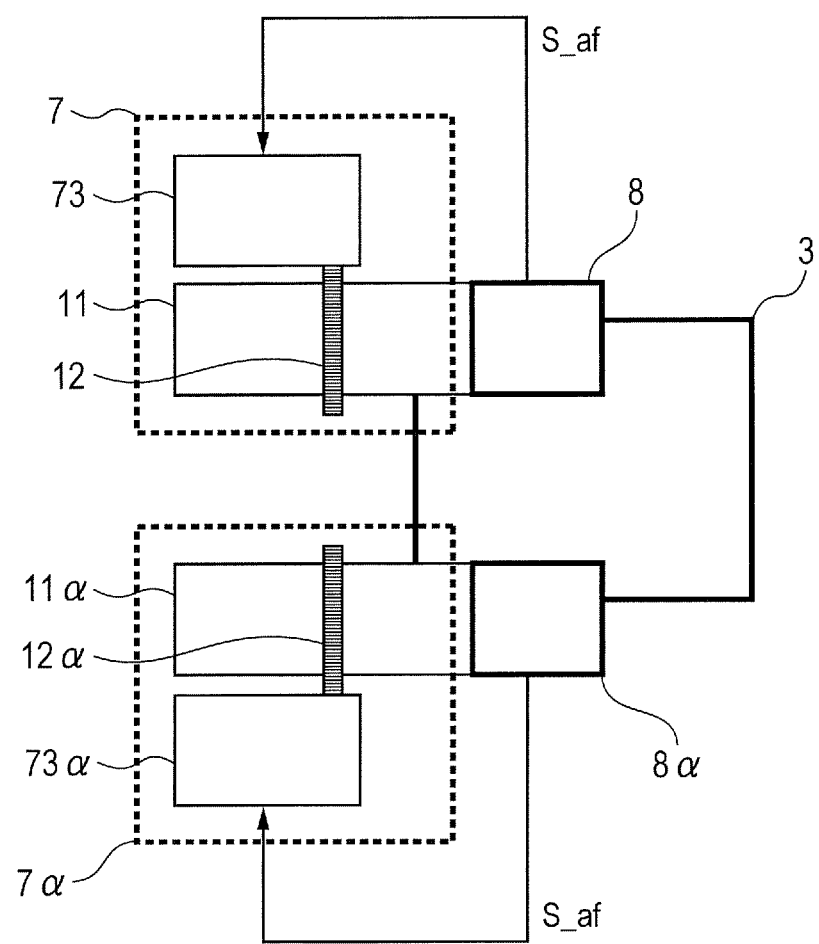
FIG. 13 is a functional block diagram of a three-dimensional image pickup system used in Embodiment 3.

FIG. 13 is a functional block diagram of the three-dimensional image pickup system used in this embodiment, which is constituted mainly of the lens apparatus 7, the lens apparatus 7α, the camera apparatus 8, the camera apparatus 8α, and the base plate 3.

The lens apparatus 7 uses a DU 73 instead of the DU 13 in Embodiment 1. In addition, the camera apparatus 8 is different from the camera apparatus 2 of Embodiment 1 in that the former includes a contrast AF controller that controls the contrast AF function. Note that, an AF signal S_af (including an AF target value or the like) computed by the contrast AF function is output from the camera apparatus 8 to the lens apparatus 7 via a communication cable.

Figure 14:
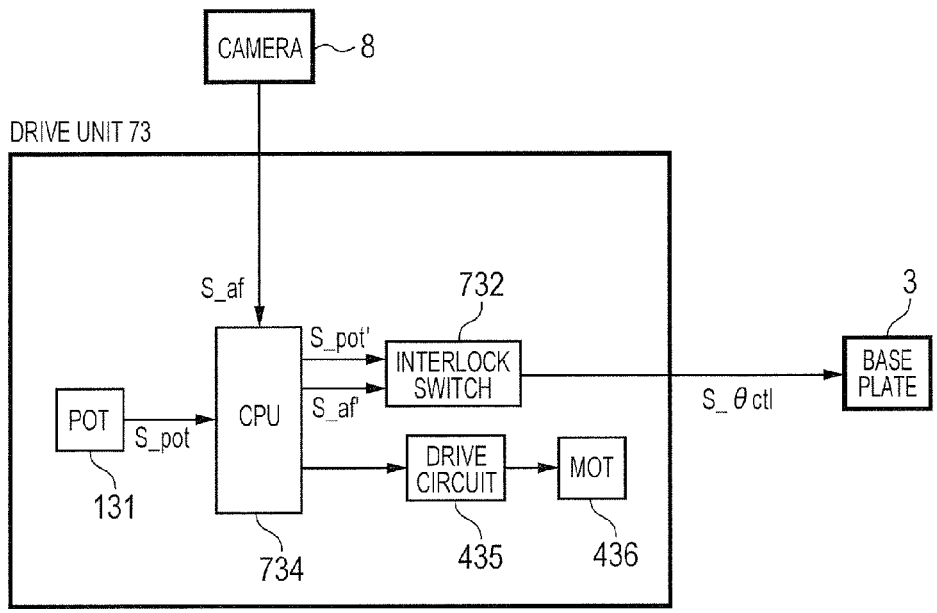
FIG. 14 is a functional block diagram of a DU 73 included in a lens apparatus 7 of Embodiment 3.

Next, with reference to FIG. 14, details of the DU 73 are described.

FIG. 14 is a functional block diagram of the DU 73.

The DU 73 of this embodiment is different from the DU 13 of Embodiment 1 in that an interlock switching unit 732 and a CPU 734 are used instead of the interlock switching unit 432 and the CPU 434. The CPU 734 is a computing unit of the DU 73, which fetches the position signal S_pot output from the POT unit 131 via the AD converter included in the CPU 734, and outputs a focus drive signal to the drive circuit 435. In addition, the CPU 734 outputs digital data S_pot' after AD conversion of the position signal S_pot to the interlock switching unit 732. Further, the CPU 734 receives the AF signal S_af output from the camera apparatus 8 and outputs wobbling information S_af' to the interlock switching unit 732.

Figure 15:
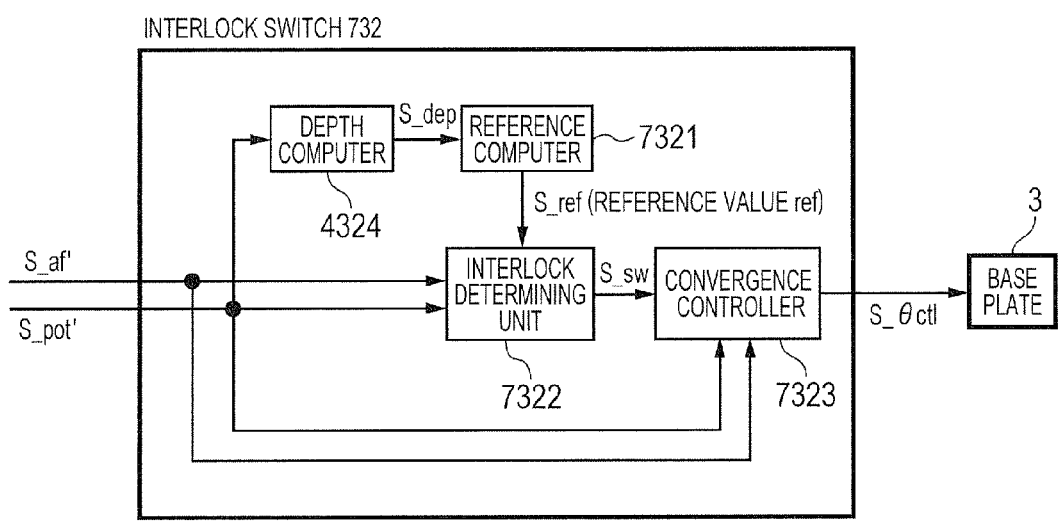
FIG. 15 is a functional block diagram of an interlock switching unit 732 included in the lens apparatus 7 of Embodiment 3.

Further, with reference to FIG. 15, details of the interlock switching unit 732 are described.

FIG. 15 is a functional block diagram of the interlock switching unit 732.

The interlock switching unit 732 is constituted mainly of a reference computer 7321, an interlock determining unit 7322, a convergence controller 7323, and a depth computer 4324.

The interlock determining unit 7322 receives the position signal S_pot', the reference signal S_ref, and the wobbling information S_af', determines to switch interlock and non-interlock between the convergence angle θ (control signal S_θctl) and the operation of the focus lens unit, and outputs the determination result as the switching signal S_sw to the convergence controller 7323. Finally, the convergence controller 7323 receives the position signal S_pot', the wobbling information S_af', and the switching signal S_sw, and outputs the control signal S_θctl to the base plate 3.

Figure 16:
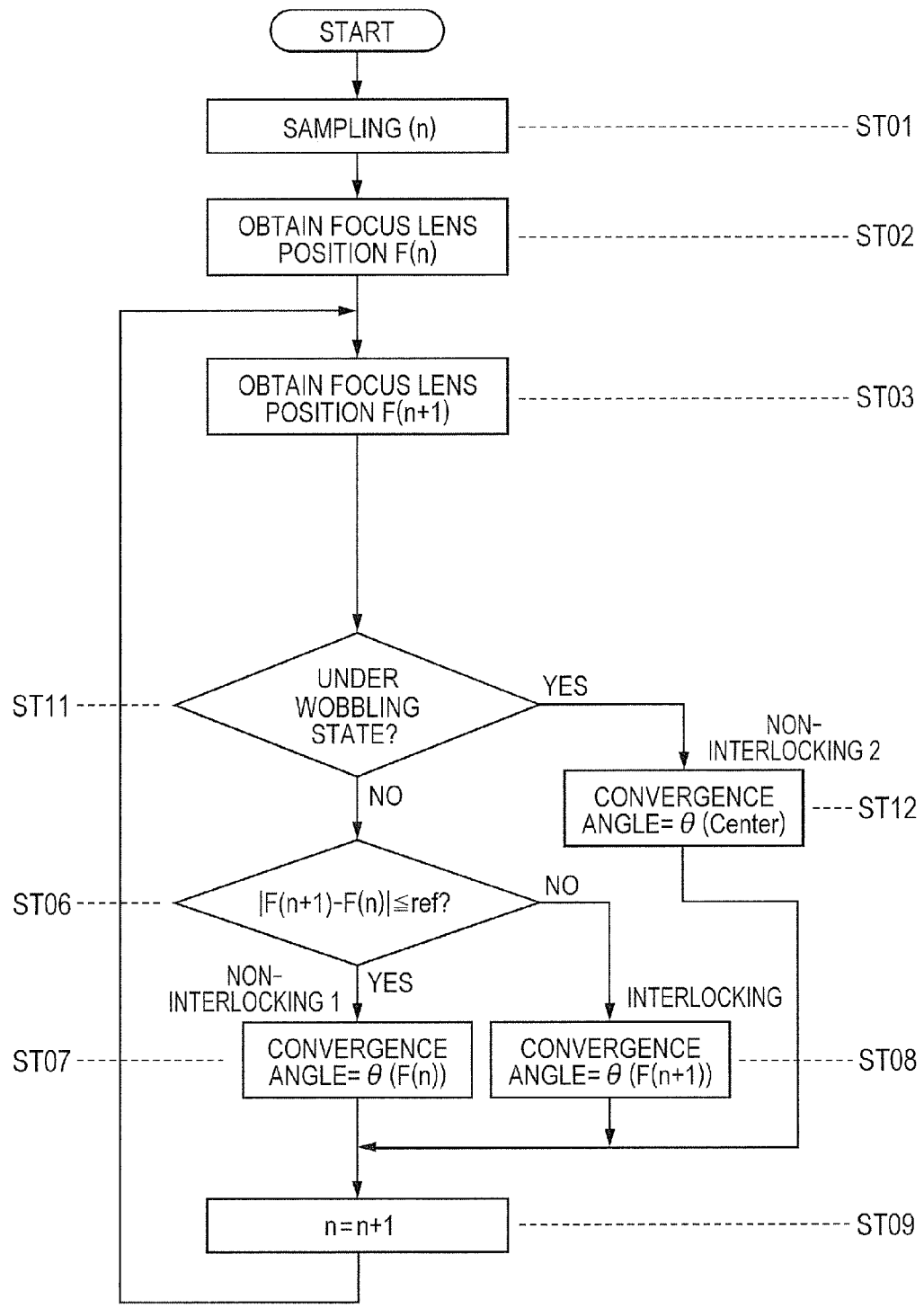
FIG. 16 is a flowchart illustrating a process about interlock switching in Embodiment 3.

Now, with reference to FIG. 16, the internal action of the DU 73, particularly a process in the interlock switching unit 732 is described in detail. Note that, description of the same step as in Embodiment 1 is omitted.

FIG. 16 is a flowchart mainly illustrating the switching process of interlock and non-interlock between the convergence angle θ (control signal S_θctl) and the operation of the focus lens unit, in which the switching is performed considering the above-mentioned wobbling function of the contrast AF.

In Step ST11, when it is in the wobbling state, the process proceeds to Step ST12. When it is not in the wobbling state, the process proceeds to Step ST06. In Step ST12, the convergence angle θ (control signal S_θctl) is set to the convergence angle corresponding to a focus lens position of the reciprocating motion center of the focus lens unit due to the wobbling.

As a result of the above-mentioned operation, in a case of the reciprocating motion of wobbling of the contrast AF, the convergence angle θ (control signal S_θctl) becomes the non-interlocked state with the operation of the focus lens unit, and hence it is possible to eliminate an undesired action of the convergence angle θ due to the interlock with the operation of the focus lens unit.

Figure 17:
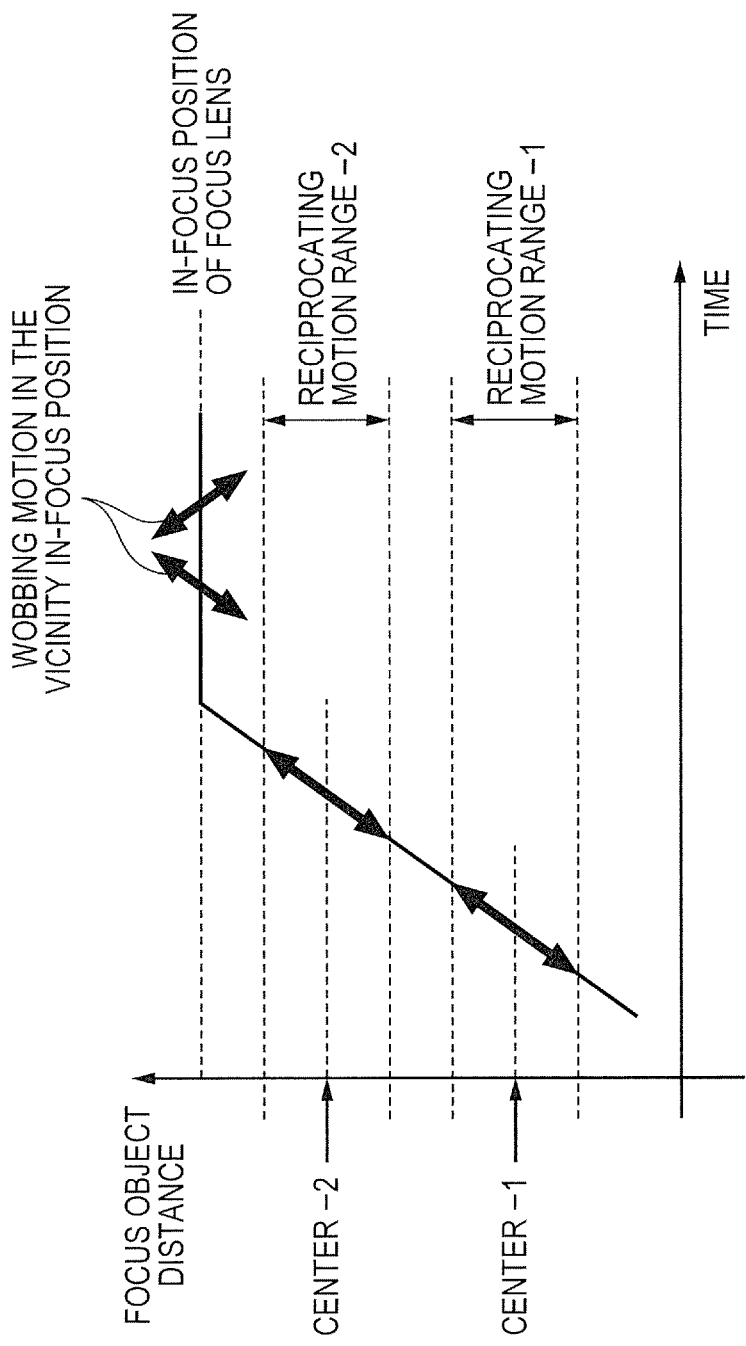
FIG. 17 is an image diagram of a wobbling motion of a contrast AF in Embodiment 3.

Here, with reference to FIG. 17, the interlock between the wobbling motion of the focus lens unit due to the contrast AF and the convergence angle θ (control signal S_θctl) is described.

FIG. 17 is an image diagram of an operation of the focus lens unit due to wobbling of the contrast AF.

As illustrated in FIG. 17, the focus lens unit is usually driven to a target in-focus position while performing the direction determination by the reciprocating motion of the wobbling.

In this case, any position in one reciprocating movement range, for example, Center 1 and Center 2, which are respectively central positions of a reciprocating movement range 1 and a reciprocating movement range 2, is regarded as a temporary focus lens position, and the convergence angles θ corresponding to the focus lens positions are respectively set during the reciprocating motions.

It is not necessary for the convergence angle θ to act in association with the reciprocating motion of the wobbling in the contrast AF. Therefore, the convergence angle θ (control signal S_θctl) is set to be in the non-interlocked state with the operation of the focus lens unit for the reciprocating motion of the focus lens unit due to the wobbling in the contrast AF.

The convergence angle is controlled to be a value corresponding to the center value in the reciprocating movement range of the focus lens unit due to the wobbling in this embodiment, but the present invention is not limited to this structure. For instance, it is possible to control so that the convergence angle becomes a value corresponding to a focus lens unit position at which the maximum value of the contrast or the maximum value in a wobbling range is detected by the wobbling motion. By designating one focus value corresponding to the convergence angle in the reciprocating movement range by the wobbling, the effect of the present invention can be obtained.

Note that, the wobbling may be activated also in the in-focus state under a condition such as low luminance. In this case, even if the reciprocating motion of the focus lens unit is within the depth of field, the convergence angle θ may act in association with the operation of the focus lens unit. However, in this embodiment, the convergence angle θ is not interlocked undesirably even in this case.

In addition, this embodiment can be applied to a so-called hybrid AF, which uses both a phase difference AF for quick determination of a direction of the in-focus position and the contrast AF for precise focus adjustment, while the contrast AF function is working with the wobbling motion, and hence the effect of the present invention can be obtained.

Another embodiment is described with reference to FIG. 18.

Here, there is described an embodiment supporting an overshoot movement that may arise by servo in the focus lens unit concerning the switching of interlock and non-interlock between the convergence angle θ (control signal S_θctl) and the operation of the focus lens unit. In a case where the focus lens unit is driven by the servo, a focus drive accompanying the so-called overshoot movement may be performed, in which the focus lens is driven to overshoot a target focus lens position and is driven in the opposite direction to reach the target position. Also in this case, if the convergence angle follows the drive of the focus lens unit successively, an image may cause a feeling of strangeness.

Figure 18:
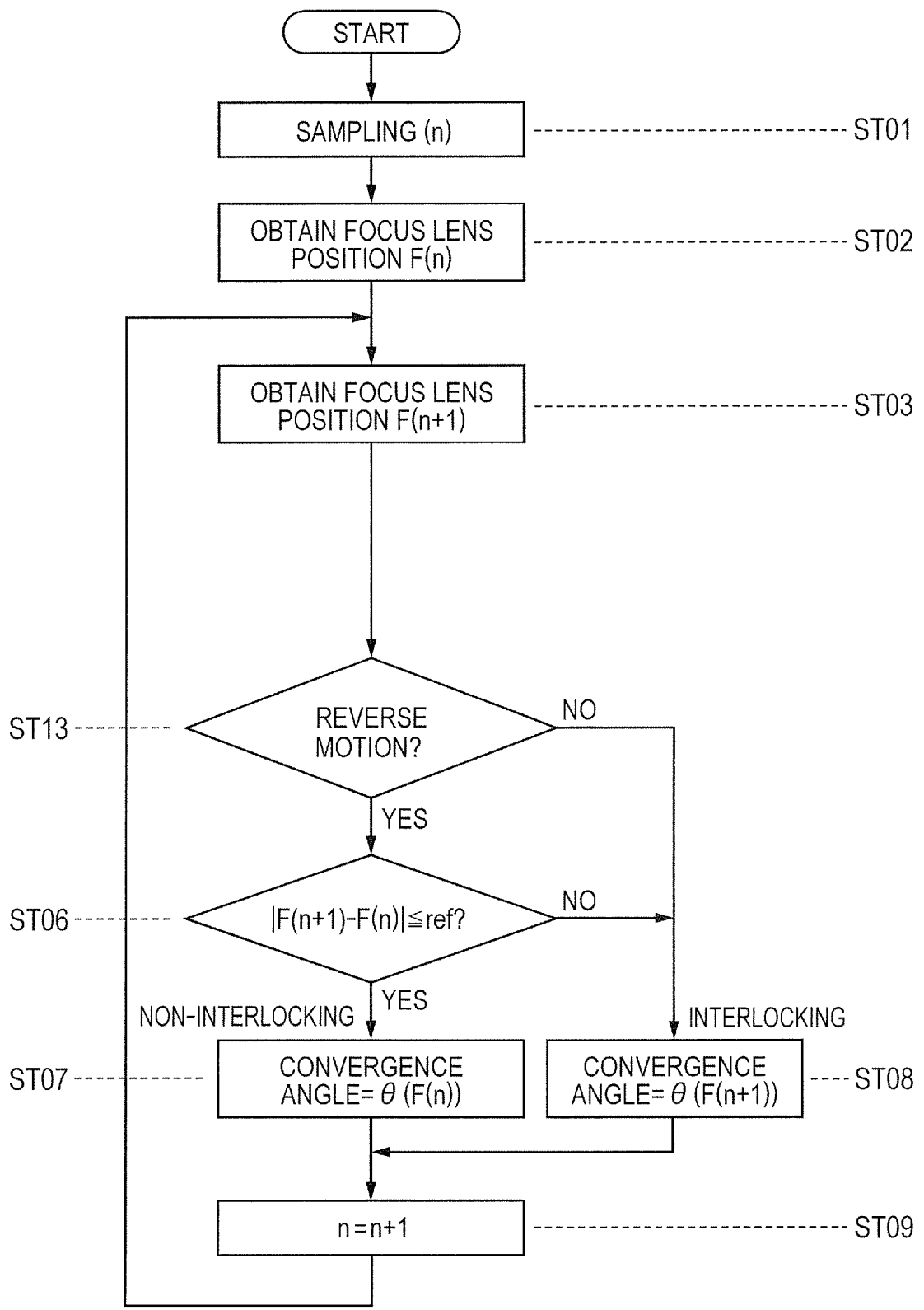
FIG. 18 is a flowchart illustrating a process about interlock switching in another example.

FIG. 18 is a flowchart mainly illustrating a switching process of interlock and non-interlock between the convergence angle θ (control signal S_θctl) and the operation of the focus lens unit, in which the switching in consideration of the above-mentioned overshoot movement is performed. This flowchart is almost the same as the flowchart of Embodiment 2 illustrated in FIG. 12, but the former is different from the latter in that the determination of the shot completion in Step ST10 in Embodiment 2 is replaced by the determination of presence or absence of a reverse motion of the focus drive in Step ST13. When it is determined in Step ST13 that there is the reverse motion of driving the focus lens unit, the process proceeds to Step ST06. When it is determined that there is not the reverse motion, the process proceeds to Step ST08, in which the convergence angle is updated to the convergence angle θ (F(n+1)) corresponding to the focus value of this time.

Here, the determination of presence or absence of the reverse motion in ST13 may be performed by checking whether or not a sign of a variation amount of the actually detected focus lens position (F(n)) has changed until reaching a target control of the focus lens unit, or may be performed with a criterion that a follow value of the focus lens unit has exceeded (has passed) a target control value of the focus lens unit.

The exemplary embodiments of the present invention are described above, but the present invention is not limited to these embodiments, which can be changed or modified variously within the scope of the spirit of the present invention. In particular, the above-mentioned interlock switching unit, shot table, and the like may be in any part of the photography system such as the lens apparatus, the camera apparatus, or the base plate. Further, in the above description, the convergence angle changing unit has the structure in which the direction of the lens apparatus is mechanically changed so that the direction of the optical axis is directly changed for changing the convergence angle, but the present invention is not limited to this structure. For instance, the present invention can be applied also to a three-dimensional image pickup system using a structure in which an optical system such as various types of an image stabilizing lens or the like movable in a direction perpendicular to the optical axis in each lens apparatus or each optical path from each lens apparatus is moved in a direction perpendicular to the optical axis so as to make the convergence angle, or a structure in which the convergence angle is operated by a mirror or the like disposed inside or outside the lens apparatus or the camera apparatus, so as to move positions of subject images on an image plane in the opposite direction for obtaining the same effect as in the case where the angle between the lens apparatus in the optical axis direction (convergence angle) is changed. Thus, the effect of the present invention can be obtained.

Further, a base line length as a distance between optical axes of the left and right lenses also affects a stereoscopic effect of the photographed 3D image. Therefore, instead of or in addition to the control of the convergence angle with respect to the operation of the focus lens unit, the base line length may also be a target of the control of interlock or non-interlock with the operation of the focus lens unit so that the effect of the present invention can be obtained.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-251467, filed Nov. 17, 2011, which is hereby incorporated by reference herein in its entirety.

What is claimed is:

1. A three-dimensional image pickup system, comprising:
a pair of lens apparatus;
a camera apparatus for picking up subject images formed by the pair of lens apparatus;
a convergence angle changing unit for changing a convergence angle of the pair of lens apparatus;
a controller for controlling the convergence angle changing unit in association with an operation of focus lens units of the pair of lens apparatus; and
an interlock switching unit for switching between an interlocked state in which the convergence angle is interlocked with the operation of the focus lens units and a non-interlocked state in which the convergence angle is not interlocked with the operation of the focus lens units.

2. The three-dimensional image pickup system according to claim 1, wherein the interlock switching unit switches to the non-interlocked state when an operation range of the focus lens units is within a reference value range.

3. The three-dimensional image pickup system according to claim 2, wherein the reference value range is an operation range of the focus lens units corresponding to a depth of field.

4. The three-dimensional image pickup system according to claim 2, further comprising a contrast AF controller for performing automatic focus based on a picked up image, wherein the reference value range is a reciprocating movement range of wobbling of the focus lens units of the contrast AF controller.

5. The three-dimensional image pickup system according to claim 1, further comprising a shot controller for controlling a shot function of the focus lens units of the pair of lens apparatus, wherein the interlock switching unit switches to the interlocked state in which the convergence angle is interlocked with the operation of the focus lens units when the focus lens units move by the shot function, and switches to the non-interlocked state in which the convergence angle is not interlocked with the operation of the focus lens units after a shot action of the focus lens units is completed.

6. The three-dimensional image pickup system according to claim 1, further comprising a contrast AF controller for performing automatic focus based on a picked up image, wherein, when the contrast AF controller causes the focus lens units to perform a wobbling motion, the interlock switching unit switches to the non-interlocked state, and the convergence angle changing unit sets the convergence angle of the pair of lens apparatus to a convergence angle corresponding to one focus lens position within a reciprocating movement range of the wobbling motion of the focus lens units.

7. The three-dimensional image pickup system according to claim 6, wherein the one focus lens position within the reciprocating movement range of the wobbling motion of the focus lens units is a central position within the reciprocating movement range.

8. The three-dimensional image pickup system according to claim 1, wherein the interlock switching unit switches to the non-interlocked state between the convergence angle and the operation of the focus lens units when the operation of the focus lens units is reversed.

9. The three-dimensional image pickup system according to claim 1, wherein the interlock switching unit switches to the non-interlocked state between the convergence angle and the operation of the focus lens units when the focus lens units overshoots a target focus lens position.

\* \* \* \* \*